Dec. 23, 1947.  S. W. LA ROCQUE  2,432,995
PICKER
Filed April 5, 1946  2 Sheets-Sheet 1
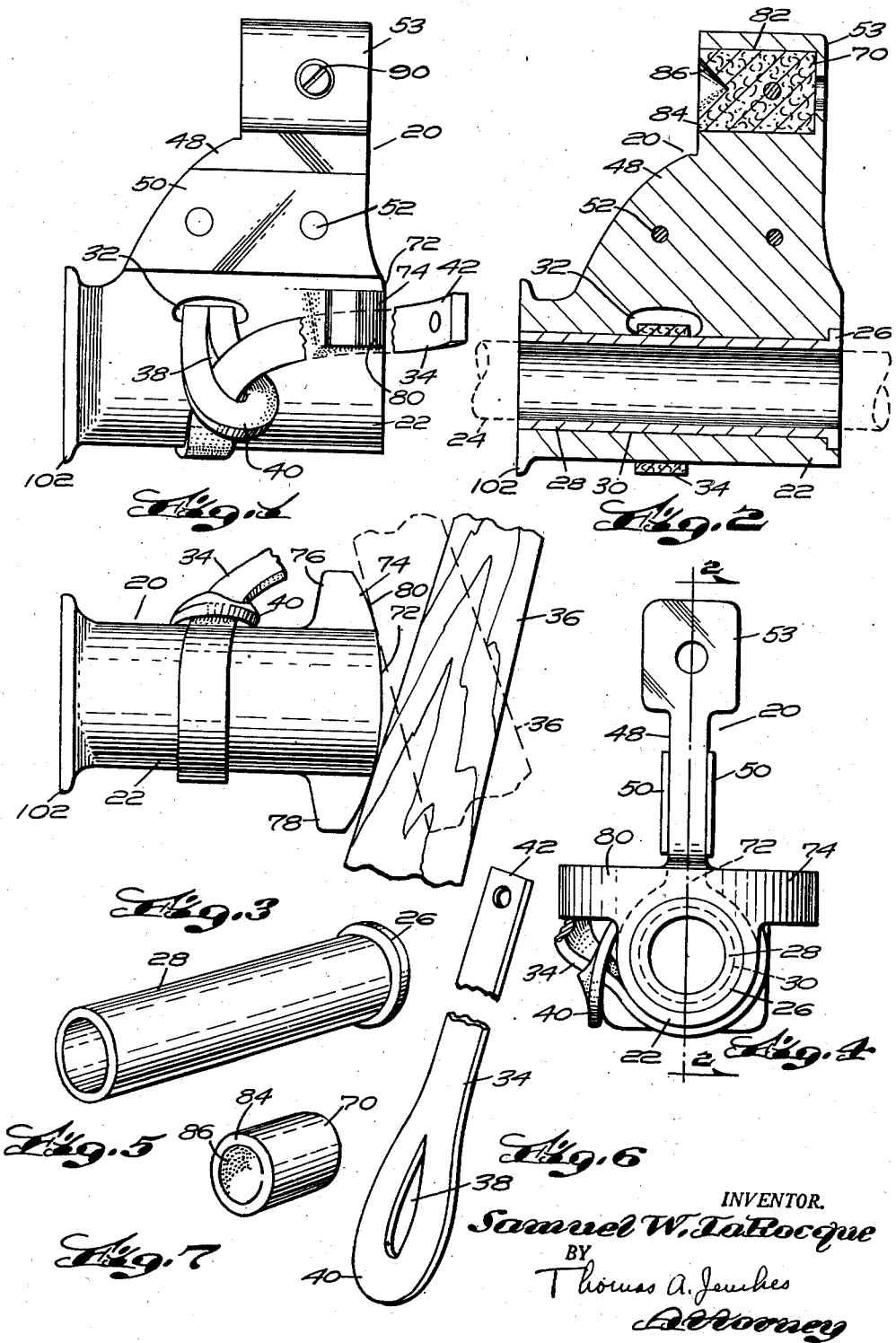

Patented Dec. 23, 1947

2,432,995

UNITED STATES PATENT OFFICE 2,432,995

PICKER

Samuel W. La Rocque, Pawtucket, R. I., assignor to The La Rocque Mfg. Co., Inc., Pawtucket, R. I., a corporation of Rhode Island Application April 5, 1946, Serial No. 659,948

4 Claims. (Cl. 139—160)

My invention relates to improvements in pickers, preferably those of a type which are interchangeable so as to provide a right and a left hand picker drive, but which embody new principles which may, if desired, be embodied in right or left hand pickers.

This application is a continuation-in-part application of my application for patent for Picker, Ser. No. 587,070, filed April 7, 1945.

Objects of my invention are to provide a novel type of picker which will last over a substantially greater amount of time than the rawhide pickers now in use, which often only last a month, and for this purpose I preferably employ a picker having a frame made of light cast or pressed magnesium or an alloy thereof which is rigid and hence wear resistant throughout, and one in which the picker head may have a recess for a replaceable picker plug which may be made of rawhide, pressed fibre, rubber or other material, to provide the desired resiliency.

A further object of my invention is to provide a picker which will not wear the picker stick so much as formerly by providing an integral picker stick bearing plate projecting vertically a substantial distance above and below the outer edge of the body portion of the picker, and preferably having a vertically convexed picker stick abutting surface to provide a substantial area of contact for the picker stick to rub against throughout the swinging arc of the picker stick in its oscillating shuttle throwing movement, thus distributing the wear over a much greater area of the picker stick than in former types where the picker stick directly abutted the narrow outer edge of the picker, and confining its contact at each instant substantially to a line contact instead of an area contact.

A further object of my invention is to provide a picker having a novel type of means for attaching it to the picker stick, said means comprising a slot in the picker immediately interior of the sleeve portion to receive the end of a picker strap having a longitudinal slit therein near the outer end thereof so that said picker strap may be threaded downwardly through said slot to leave the slitted outer end thereof over the sleeve, passed through the slit and have the inner end thereof detachably secured to the inner wall of the picker stick. In the prior art it has been customary to screw the inner end of the picker strap to the picker thereby providing a structure in which a sharp bending strain takes place in the leather adjacent its point of attachment on the picker, it being apparent that with the many flexings of the strap of this point that they have soon worn out in use. Employing my structure, however, as there is no particular line of flexion in the strap, it is obvious that my novel type of picker strap may be employed for a long time in use without the necessity of replacing it.

A further object of my invention is to provide a picker having a flange of greater area on the inner end thereof to provide a large surface for abutting the leather buffer strap normally mounted on the picker rod, throughout a large area thereof, much larger than formerly, to permit such buffer straps to last over a greater period of time in use.

Further objects of my invention relate to the inherent structure of the picker itself which is preferably constructed to have a maximum amount of strength with a minimum amount of weight.

These and such other objects of my invention as may hereinafter appear will be best understood from a description of the accompanying drawings, which illustrate an embodiment thereof.

In the drawings,

Fig. 1 is a plan view of a picker constructed with its picker strap attached in accordance with my invention.

Fig. 2 is a horizontal sectional view taken through the center thereof to illustrate the structure of the picker head plug, illustrating the picker mounted on the picker rod, shown in dotted lines.

Fig. 3 is a rear edge view demonstrating how the picker stick bearing plate distributes the wear throughout a greater area of the picker stick and is limited substantially to a line contact therewith.

Fig. 4 is an end elevation from the outer edge of the picker.

Fig. 5 is a perspective view of the cylindrical hard metal bearing for the sleeve portion of the picker I preferably employ.

Fig. 6 is a plan view of the novel type of picker strap I preferably employ.

Fig. 7 is a rear perspective view of the replaceable picker plug for the picker head I preferably employ.

Figure 8:
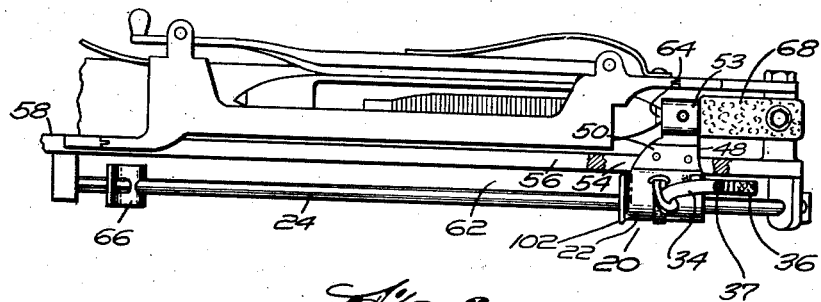
Fig. 8 is a diagrammatic plan view of portions of the lay and shuttle box of a loom illustrating the picker stick in retracted position just prior to throwing a shuttle across the lay.

In the drawings, wherein like characters of reference generally indicate like parts throughout, 20 generally indicates a picker constructed in accordance with my invention. I have shown a picker capable of functioning as either a right hand picker or a left hand picker. It is obvious that if desired certain features of my invention incorporated therein may be employed in right or left hand non-interchangeable pickers. My improved picker is constructed of magnesium or its alloys. Said picker includes the usual sleeve portion 22, slidable on a standard picker rod 24.

As I construct my improved picker out of magnesium or its alloys, it is apparent that I have provided a picker, which not only is very light but which is relatively strong and sufficiently wear resistant to last throughout a long period of time and which only weighs slightly more than the standard type of rawhide picker. In order, however, to increase the life of the picker, I preferably provide it with the lining bushing 28 which is secured within the hollow interior 30 of the sleeve 22. Said lining 28 may be provided with an annular shoulder 26 for the outer end of the picker projecting outwardly therefrom to hold it firmly within the sleeve 22.

My invention also relates to improvements in the method I employ for securing my improved picker 20 to the picker stick 36 and for this purpose I employ the relatively short picker strap 34. To attach the strap 34 to the picker I provide a picker strap hole 32 in the body of the picker immediately to the rear of the sleeve 22 and I provide the outer end of the picker strap 34 with the elongated longitudinal slit 38. To attach the strap 34 to the picker 20, therefore, I insert the outer end 40 thereof upwardly through the slot 32 and insert the free end 42 of the picker strap 34 through the slit 38, over the sleeve 22, and the relatively short end 42 of the picker strap 34 is then attached to the inner wall of the picker stick 36 in any suitable manner such as by means of the screw 37. It is apparent with this construction that I have provided a much shorter picker strap 34 than formerly and one in which there is no shock, line flexion, wear or breakage as is always present when the picker strap 34 has been screwed to the picker 20.

My improved picker also preferably has the usual flat body portion 48 projecting horizontally forwardly from said sleeve portion 22, which may have the flat hard metal slide plates 50 mounted on the upper and lower surfaces thereof in any suitable manner, such as by the rivets 52, for the purpose of abutting the usual edges of its longitudinal slide 54 in the rear of the shuttle box casing 56 opposite the top of the lay 58. While my improved picker constructed of magnesium will last a relatively long time without the supplemental hard metal slide plates 50, its length of life may be considerably lengthened by their addition thereto. The usual head 53 is mounted on the front edge of said body portion 48.

Figure 9:
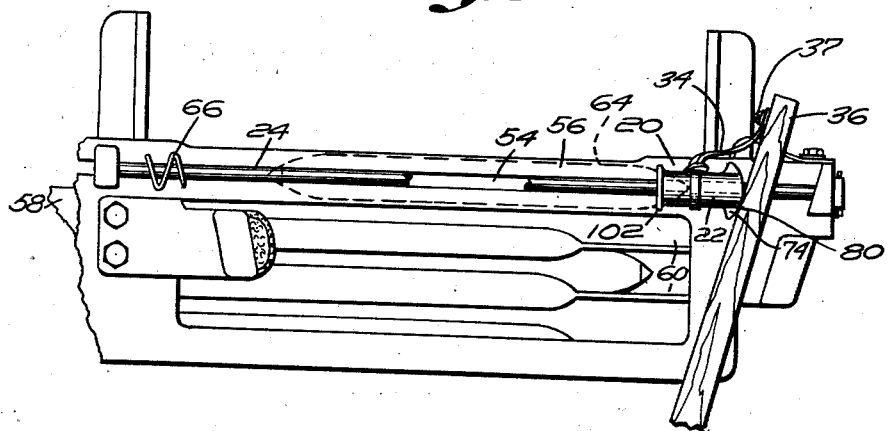
Fig. 9 is a rear elevation of the parts shown in Fig. 8 in the position they assume therein.
Figure 10:
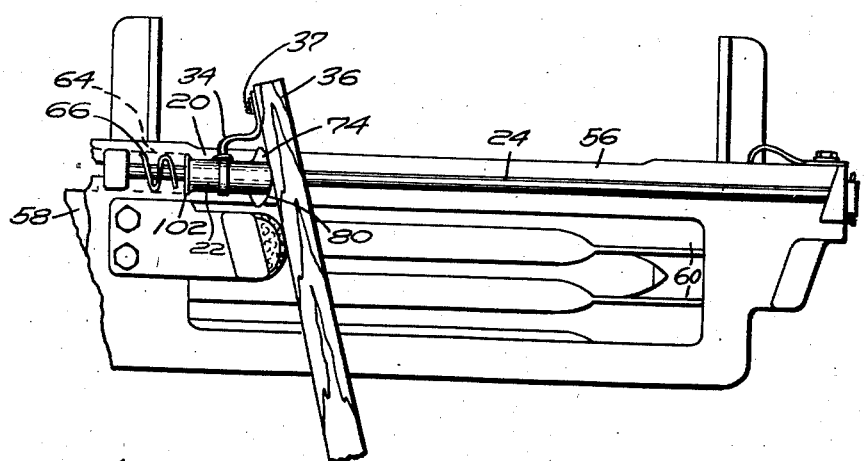
Fig. 10 is a rear elevation similar to Fig. 9 of the same parts shown therein after the picker stick and picker have been oscillated forward to throw the shuttle across the lay.

I have shown in Figs. 8–10 the corresponding parts of the shuttle box and lay. A shuttle box casing 56 is mounted on the upper surface of the lay 58 at each end thereof and the replaceable shuttle boxes 60 are reciprocatable up and down on an end of said lay in any suitable manner (not shown). The shuttle box casing 56 has the longitudinal slide 54 in the rear surface thereof through which the body portion 48 of the picker 20 projects with the slide plates 50 thereof abutting the edges of said slide 54 in the manner hitherto described. The picker stick 36 is reciprocated by suitable means (not shown), in the space 62 formed between the rear edge of the shuttle box casing 56 and the picker rod 24 on which the sleeve 22 of the picker 20 slides. The inner edge of the picker stick 36 abuts the outer edge of the picker body portion 48 to throw the picker 20 substantially the length of the space 62 to cause it to urge the shuttle 64 to cross the lay 58. As stated, the strap 34 loosely joins the sleeve portion 22 of the picker 20 to the inner edge of the picker stick 36 as at 37 to cause the picker stick 36 on its outward throw to drag the picker 20 with it. A suitable buffer strap or spring 66 made of leather or other suitable material may be mounted on the picker rod 24 to ease the inward stroke of the picker, and similarly may a suitable buffer device 68 be mounted on the outer end of the shuttle box to abut the outer edge of the picker head 53 to ease its outer stroke and to keep it in proper alignment.

I have also shown my improved picker sleeve with the annular reinforcing flange 102 projecting radially outwardly from the outer end thereof to provide a greater area of contact against the leather buffer strap 66.

It will be apparent that on the inward throw of the picker stick 36, the outer edge 72 of the body portion 48 of the picker 20, of relatively small thickness, has normally abutted a small area of the picker stick 36, and inasmuch as the picker stick swings in an arc, the flat surface 72 riding up and down against the inner edge of the picker stick 36 has tended to rapidly wear out the picker stick. I believe I am the first to provide means to prevent the rapid wearing out of the picker stick 36 at this portion, and for this purpose I have provided the picker stick bearing plate 74 projecting integrally vertically a substantial distance 76 and 78 above and below said body portion 48 from said outer edge 72 of said body portion 48, and in order that there may preferably only be a line contact instead of an area contact between the picker and picker stick on the inward throw of the picker stick, I preferably provide said plate 74 with a vertically convexed picker stick abutting surface 80. It is obvious, therefore, that there will be a continuous line contact as the picker stick swings from its outer to its inner position on the inward stroke thereof to throw the shuttle across the lay, and hence only successive lines of wear instead of an area wear on the picker stick.

While any suitable type of a picker head 53 may be provided on the front end of the body portion, as stated hitherto, I preferably employ a detachable plug 70 for this purpose. The picker head 53 is preferably provided with the recess 82 extending outwardly from the inner edge thereof and the replaceable picker plug 70 is detachably contained within said recess 82. The inner shuttle abutting edge 84 of said plug 70 is preferably provided with a central conical recess 86 for receiving the end of the shuttle 64 therein. The removable plug 70 may be secured within said recess 72 by the screw 90, which forms a hole in said plug 70, while being inserted, to retain said plug 70 within said recess. I preferably employ a resilient plug which may be made of rawhide, pressed fibre, rubber or other suitable material.

I employ the word magnesium in the claims to include a pure magnesium or an alloy consisting essentially of magnesium with a relatively small amount of other metal added thereto for hardening purposes.

My improved picker is attached and operates in similar fashion to former types, but for the reasons given above is stronger and lighter and lasts longer than former types of pickers and has the other advantages hereinbefore set forth.

It is understood that my invention is not limited to the specific embodiments shown and that various deviations may be made therefrom without departing from the spirit and scope of the appended claims.

What I claim is:

1. A single piece interchangeable picker constructed of magnesium comprising a sleeve portion having a hard metal bearing slidable on a picker rod and having a flange of greater area on the inner end thereof to provide a large surface for abutting the picker rod buffer strap throughout a large area thereof, an integral flat thin body portion projecting horizontally forwardly from said sleeve portion having hard metal slide plates on each side thereof and a picker stick bearing portion projecting vertically a substantial distance above and below said body portion from the inner edge thereof having a vertically convexed picker stick abutting surface, a vertical picker stick strap hole therein immediately adjacent said sleeve, a short picker strap having a longitudinal slit in the outer end thereof passed through said hole to leave the slitted outer end thereof over the sleeve and passed through said slit and having the inner end thereof detachably secured to the inner wall of a picker stick and a picker head portion on the front end of said body portion having an inwardly facing socket for receiving a replaceable resilient picker head.

2. A single piece interchangeable picker constructed of magnesium comprising a sleeve portion slidable on a picker rod, an integral flat thin body portion projecting horizontally forwardly from said sleeve portion and having a picker stick bearing portion projecting vertically a substantial distance above and below said body portion from the inner edge thereof having a vertically convexed picker stick abutting surface, a vertical picker stick strap hole therein immediately adjacent said sleeve, a short picker strap having a longitudinal slit in the outer end thereof passed through said hole to leave the slitted outer end thereof over the sleeve and passed through said slit and having the inner end thereof detachably secured to the inner wall of a picker stick and a picker head portion on the front end of said body portion having an inwardly facing socket for receiving a replaceable resilient picker head.

3. A single piece interchangeable picker constructed of magnesium comprising a sleeve portion having a hard metal lining slidable on a picker rod, an integral flat thin body portion projecting horizontally forwardly from said sleeve portion having hard metal slide plates on each side thereof and a picker stick bearing portion projecting vertically a substantial distance above and below said body portion from the inner edge thereof having a vertically convexed picker stick abutting surface and a picker head portion on the front end of said body portion having an inwardly facing socket for receiving a replaceable resilient picker head.

4. A single piece interchangeable picker constructed of magnesium comprising a sleeve portion having a hard metal lining slidable on a picker rod, an integral flat thin body portion projecting horizontally forwardly from said sleeve portion having a picker stick bearing portion projecting vertically a substantial distance above and below said body portion from the inner edge thereof having a vertically convexed picker stick abutting surface and a picker head portion on the front end of said body portion having an inwardly facing socket for receiving a replaceable resilient picker head.

SAMUEL W. LA ROCQUE.

REFERENCES CITED

The following references are of record in the file of this patent:

UNITED STATES PATENTS

| Number | Name | Date |
|---|---|---|
| 681,599 | Wardwell | Aug. 27, 1901 |
| 2,223,857 | Prina et al. | Dec. 3, 1940 |
| 2,259,805 | Deconing | Oct. 21, 1941 |

FOREIGN PATENTS

| Number | Country | Date |
|---|---|---|
| 12,392 | Great Britain | June 22, 1915 |
| 18,293 | Great Britain | Oct. 24, 1890 |